(No Model.)

D. PETTIT & J. R. CONGDON.
BALL BEARING FOR VEHICLES.

No. 494,384. Patented Mar. 28, 1893.

Witnesses
H. D. Turner
Murray C. Boyer

Inventors
David Pettit &
John R. Congdon
by their Attorneys
Howson & Howson

UNITED STATES PATENT OFFICE.

DAVID PETTIT, OF BEVERLY, NEW JERSEY, AND JOHN R. CONGDON, OF PHILADELPHIA, PENNSYLVANIA, ASSIGNORS TO THE COMMON SENSE BICYCLE MANUFACTURING COMPANY, OF PHILADELPHIA, PENNSYLVANIA.

BALL-BEARING FOR VEHICLES.

SPECIFICATION forming part of Letters Patent No. 494,384, dated March 28, 1893.

Application filed October 12, 1892. Serial No. 448,641. (No model.)

*To all whom it may concern:*

Be it known that we, DAVID PETTIT, a resident of Beverly, Burlington county, New Jersey, and JOHN R. CONGDON, a resident of Philadelphia, Pennsylvania, citizens of the United States, have invented certain Improvements in Ball-Bearings for Vehicles, of which the following is a specification.

One object of our invention is to provide simple and effective means for adapting a ball bearing to an ordinary carriage axle journal, a further object being to so construct the bearing that it can be readily and securely attached to the hub of the wheel.

Figure 1:
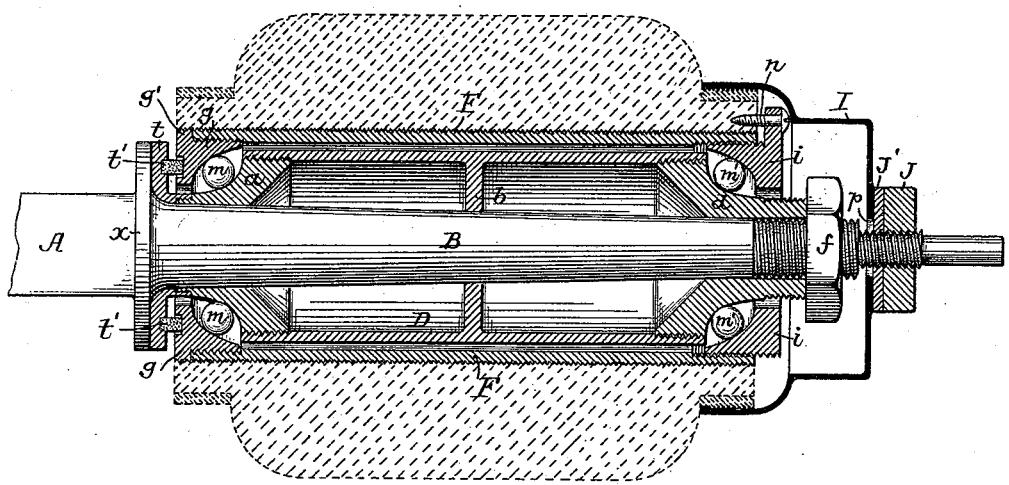
Figure 2:
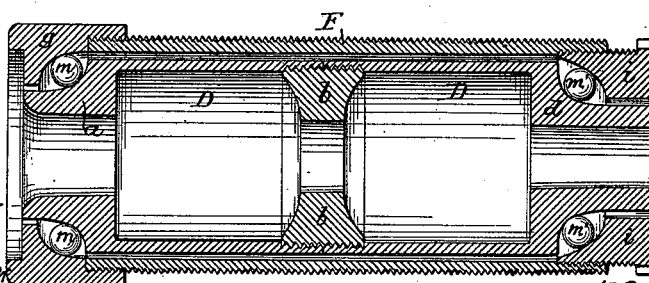

In the accompanying drawings:—Figure 1, is a sectional view of our improved ball bearing structure as applied to the journal of an ordinary carriage axle; and Fig. 2, is a sectional view of a special form of bearing constructed in accordance with our invention.

In Fig. 1 A represents part of an ordinary carriage axle having a collar $x$ beyond which is a projecting journal B the latter, in the present instance, being tapered, although it should be understood that our invention is applicable to axles having straight journals as well.

Mounted upon the journal B is a sleeve or casing D which has, in the present instance, three internal rings or flanges $a$, $b$ and $d$, the ring $a$ being at the inner end of the sleeve, the ring $d$ at the outer end of the same, and the ring $b$ at a point about midway of the sleeve, although the latter ring may, if desired, be dispensed with. These rings are reamed out so as to fit snugly to the journal B and are forced upon said journal by a nut $f$ adapted to the threaded outer end of the journal and bearing upon the end of the outermost ring $d$.

The sleeve D with its internal rings forms a columnar structure of great strength which can be readily fitted to any journal by simply reaming out the rings so as to fit said journal, the fact that the rings have their bearing upon the journal at separated points insuring the snug fitting of the structure to said journal irrespective of any local inequalities in the latter which would interfere with the proper fit of a sleeve intended to bear upon the journal throughout its entire length.

Screwed into the hub of the wheel shown by dotted lines in the drawings is an externally threaded sleeve F, and screwed into the opposite ends of this sleeve are internally projecting rings, that at the inner end of the sleeve being shown at $g$ and that at the outer end of the sleeve at $i$. The rings $a$ $d$ $g$ and $i$ have concave surfaces and between the rings $a$ and $g$ is confined the inner set of balls $m$ of the bearing while between the outer rings $d$ and $i$ is confined the outer set of balls $m'$. The rings $a$ and $d$ are screwed up to seats at the bases of the threads formed in the sleeve D and the ring $g$ is likewise screwed up to a seat at the base of the thread formed in the inner end of the sleeve F, but the outer ring $i$ is adjustable in order to set the bearing and compensate for wear, said ring being confined in position after adjustment by a set screw $n$ screwed into the end of the hub. Screwed to the inner end of the ring $a$ is a ring $t$ which bears against the collar $x$ on the axle A and is grooved for the reception of a ring $t'$ of felt, leather, or equivalent material which projects into and seats against the base of a groove formed in the inner face of the ring $g$ of the hub sleeve F so as to serve the double purpose of preventing the access of dust to the bearing at the inner end of the same and of preventing the escape of oil from the bearing at said inner end.

A cap I is screwed onto the outer hub ring, and in this cap is an opening $p$ through which passes the reduced and threaded end of the journal B, to which may be secured a brace, tie, or wheel guard, the projecting end of the journal also receiving a nut J, which serves to press a washer $J'$ into contact with the outer face of the cap I, and thus provides an oil and dust proof joint at the outer end of the bearing.

The ring $g$ has a flange $g'$ which is flush with the outer face of the sleeve F and is threaded similarly to said sleeve so that the sleeve can be screwed into the hub of the wheel, after the application of the rings thereto.

In some cases it may be advisable to make the sleeve D in two parts, united at the center preferably by screwing them onto the central ring b, as shown in Fig. 2, in which case the end rings a and d may be integral with their respective sections of the sleeve. The inner ring g may also, if desired, be screwed onto the sleeve F, as shown in Fig. 2, when the sleeve is screwed into the hub from the inner end of the latter.

In some cases the hub sleeve may have a plain instead of a threaded exterior so as to be driven instead of screwed into the hub, but the threaded sleeve is preferred.

Having thus described our invention, we claim and desire to secure by Letters Patent—

1. The combination of an axle having a projecting journal with a ball bearing having as one of its elements a sleeve with internally projecting rings at the ends, said rings being seated upon the journal respectively at the inner and outer ends thereof, substantially as specified.

2. The combination of the axle having a projecting journal with a ball bearing having as one of its elements a sleeve with internally projecting rings seated upon the journal, one of said rings being located at the inner end and one at the outer end of the journal, and a third ring being about midway of the journal, substantially as specified.

3. The combination in a ball bearing, of the inner bearings for the balls, with the outer bearings carried by a sleeve having a periphery of uniform diameter from end to end of the hub and having at each end an internally projecting ring forming an outer bearing for the balls, substantially as specified.

4. The combination in a ball bearing, of the inner bearings for the balls, with the outer bearings consisting of internally-projecting rings carried by a sleeve having a uniform diameter from end to end of the hub, and threaded exteriorly so as to be screwed into said hub, substantially as specified.

5. The combination in a ball bearing of the inner bearings for the balls, with the outer bearings carried by a sleeve having uniform diameter from end to end of the hub, one or both of said outer bearings having a flange flush with the exterior of the sleeve, substantially as specified.

6. The combination of the hub sleeve having at its ends bearings for the balls, with an inner sleeve made in two parts joined together, and each having an internal ring bearing upon the axle journal, and constituting a bearing for the balls, substantially as specified.

7. The combination of an axle having a projecting journal with a ball bearing consisting of a sleeve mounted upon said journal and carrying bearings for the balls, a sleeve adapted to the hub, and also carrying bearings for the balls, a ring rigidly mounted upon the axle, and a packing ring confined between said ring and the inner bearing of the hub sleeve, and serving to prevent access of dust to or escape of oil from the bearing at the inner end, substantially as specified.

8. The combination of the hub sleeve and journal sleeve and their ball bearings, with the hub cap and the journal projecting through an opening in said hub cap for the attachment of a tie, brace, guard, or the like, substantially as specified.

9. The combination of the hub sleeve and journal sleeve and their ball bearings, the hub cap, the journal projecting through an opening therein, and the nut and washer applied to the projecting portion of the journal to form a dust and oil proof joint with the cap, substantially as specified.

In testimony whereof we have signed our names to this specification in the presence of two subscribing witnesses.

DAVID PETTIT.
JOHN R. CONGDON.

Witnesses:
FRANK BECHTOLD,
JOSEPH H. KLEIN.